(12) United States Patent
Prodell

(10) Patent No.: US 6,742,914 B2
(45) Date of Patent: Jun. 1, 2004

(54) LIGHT HAVING A NON-UNIFORM LIGHT EMISSION

(75) Inventor: Peter Prodell, Trostberg (DE)

(73) Assignee: Siteco Beleuchtungatechnik GmbH, Traunreut (DE)

( * ) Notice: Subject to any disclaimer, the term of this patent is extended or adjusted under 35 U.S.C. 154(b) by 0 days.

(21) Appl. No.: 09/803,480

(22) Filed: Mar. 9, 2001

(65) Prior Publication Data

US 2001/0028564 A1 Oct. 11, 2001

(30) Foreign Application Priority Data

Mar. 9, 2000 (DE) .......................................... 100 11 304

(51) Int. Cl.⁷ .............................................. F21V 13/14
(52) U.S. Cl. ....................... 362/329; 362/328; 362/245; 362/293
(58) Field of Search ................................ 362/329, 330, 362/339, 333, 331, 332, 217, 293, 268, 225, 241, 247, 248, 245, 246, 224, 328

(56) References Cited

U.S. PATENT DOCUMENTS

| | | | | |
|---|---|---|---|---|
| 3,288,990 A | * | 11/1966 | Stahlhut | ...................... 362/330 |
| 3,988,609 A | * | 10/1976 | Lewin | .......................... 362/217 |
| 4,488,208 A | * | 12/1984 | Miller | .......................... 362/339 |
| 4,542,449 A | * | 9/1985 | Whitehead | .................. 362/330 |
| 5,034,864 A | * | 7/1991 | Oe | ............................... 362/224 |
| 5,122,940 A | | 6/1992 | Wiegand | |
| 5,396,350 A | | 3/1995 | Beeson et al. | |
| 5,555,109 A | | 9/1996 | Zimmerman et al. | |
| 5,863,114 A | | 1/1999 | Nagatani et al. | |
| 6,062,704 A | * | 5/2000 | Holder | ......................... 362/247 |

FOREIGN PATENT DOCUMENTS

| | | |
|---|---|---|
| DE | 89 15 821 U1 | 9/1992 |
| DE | 299 03 847 U1 | 3/2000 |
| DE | 199 03 331 | 8/2000 |
| EP | 0 453 956 | 10/1991 |
| EP | 0 638 764 | 2/1995 |
| EP | 0 846 915 | 6/1998 |
| EP | 0 978 683 | 2/2000 |

* cited by examiner

*Primary Examiner*—Sandra O'Shea
*Assistant Examiner*—Bao Truong
(74) *Attorney, Agent, or Firm*—Duane Morris LLP

(57) ABSTRACT

A lighting fixture that has a plurality of differently fashioned regions wherein different light emission properties occur. The fixture includes at least one hollow light guide having a cavity, one or more bulbs that emit light into the cavity of the hollow light guide, and at least one light output device having a light-refractive structure for outputting light from the cavity of the hollow light guide to a light exit face. The light output device forms at least a part of the wall of the hollow light guide and the light of at least one bulb that directs light into the hollow light guide is beamed out in different regions of the lighting fixture that have different light emission properties.

37 Claims, 14 Drawing Sheets

LIGHT HAVING A NON-UNIFORM LIGHT EMISSION

BACKGROUND OF THE INVENTION

The invention is directed to a light having a non-uniform light emission, i.e. a light wherein the light emission characteristics are different in various regions.

Lights with different light emission characteristics were hitherto realized in that the light technology of two different lights was integrated into one housing, i.e., ultimately, two lamps having a respectively separate bulb, a separate reflector and the like, were integrated in one housing. It has also been proposed to split the light of a bulb into a direct and into an indirect light part with suitable design of the reflectors. In addition, for example, EP-0 638 764 B1 discloses that a part of the light of a bulb that outputs light via a first light exit face is conducted to a second light exit face.

These latter proposals have in fact proven themselves in practice. It is nonetheless disadvantageous that the splitting of the light of the bulb and conducting it to the respective, different light exit faces was complicated with the traditional technologies. This was particularly true when a shielding of the emerging light was to be respectively produced at the various light exit faces.

SUMMARY OF THE INVENTION

The invention is based on the object of making a new lighting fixture type available wherein different emission properties in different regions can be realized more simply then previously.

Inventively, this object is achieved by a lighting fixture that has a plurality of differently fashioned regions which have different light emission properties. The lighting fixture has at least one hollow light guide having a cavity, one or more bulbs that emit light into the cavity of the hollow light guide, and at least one light output device having a light-refractive structure for outputting light from the cavity of the hollow light guide to a light exit face, the light output device or, respectively, the light output devices form walls of the hollow light guide or a part thereof, and the light of at least one bulb that beams light into the hollow light guide is beamed out in different regions of the lighting fixture that have different light emission properties.

The invention can provide that the hollow light guide comprises a plurality of differently fashioned regions which have different light output properties.

The invention can provide that the hollow light guide comprises a plurality of differently fashioned regions so that the light output via a light output device has different properties.

It can be provided that the light emitted via a light exit face of the lighting fixture in a first region has a symmetrical light intensity distribution curve and has an asymmetrical light intensity distribution curve in a second region.

It can be provided that a light output device has a plurality of regions having different light-refractive structures, particularly structures having a different light refraction behavior, for example prism structures with the same refractive index having a different prism angle for the light output.

In particular, a structure can be provided in a first region that generates a shielded light intensity distribution curve and a structure can be provided in a second region that generates a wide-angle, essentially non-shielded light intensity distribution curve that can be asymmetrical or exhibit a minimum at small angles.

It can also be provided that the light output device comprises two agents offset in the direction of a lamp axis that has a different light-refractive structure.

It can also be provided that a first region having a first light-refractive structure surrounds a second region having a second light-refractive structure on a plurality of sides. For example, the first region can adjoin the second region at two or three sides or can also completely surround it.

The invention can provide that a structure having prisms or prism-like elements with a prism angle of more then 90°, particularly 90° through 130°, and preferably 110° through 128° is provided in a first region, and a structure having prisms or prism-like elements with a prism angle of 55° through 80°, preferably 60° through 75°, is provided in a second region, respectively having a refractive index of 1.49 or, for a different refractive index having prism angles that lead to the same refraction behavior.

The invention can also provide that a reflective wall residing opposite a light output device, particularly a cap reflector, is differently fashioned in different regions offset along the direction of a lamp axis.

It can be provided that a reflective wall residing opposite a light output device comprises two regions offset in the direction of the lamp axis. The wall is differently curved with reference to a plane residing perpendicularly relatively to the lamp axis or is inclined relative to the light output device.

It can also be provided that a reflective wall residing opposite a light output device is directed relative to a lamp in a first region so that the light incident onto the wall from the lamp is incident essentially at a side facing toward the cavity and is reflected into the cavity. In a second region, the light of the same lamp, which is incident onto the wall, is reflected at least partially and may be completely reflected onto that side facing away from the cavity and is therefore reflected away from the cavity for output of an indirect light part.

In particular, the invention can provide that a lamp inputs light into the cavity, at least in regions, via a side between a reflective wall residing opposite a light output device and the light output device. The distance of the reflective wall from the surface wherein the light output device lies is greater in a first region of the hollow light guide than in a second region offset from the first region in the direction of the axis of the lamp. The distance can disappear in a second region or returned to zero, so that the light of the lamp is emitted entirely or partially past the hollow waveguide and can be employed as indirect light part of the lighting fixture.

The invention can provide that a lamp beams light onto the reflective wall only in a part of the offset regions, particularly in only one such region.

The invention can provide that a light output face comprises a first region having a first average luminous intensity and a second region adjoining the first region and having a second average luminous intensity that is lower than the first luminous intensity. In this way, a soft transition of the luminous intensity to the surroundings can be produced.

The invention can provide that the light output device comprises a planar, light-transmissive element, particularly a foil or plate, and a part of this element is provided with a partially light-transmissive coating that is preferably fashioned partially reflective in the direction of the cavity.

The invention can provide that an element that reduces the light intensity, for example a foil or plate, precedes or follows an element having a light-refractive structure in a sub-region in the light output device. This additional element need not necessarily comprise a light-refractive structure and preferably precedes said light-refractive structure.

The invention can provide that a partially light-transmissive element is arranged in the inside of the cavity at a distance from the light output device, and the element reduces the light intensity of the light incident onto a sub-region of the light output device. This element can, in particular, be a partially light-transmissive and a partially reflective plate or foil that is arranged spaced from the light output device between the light output device and a wall that lie opposite the light output device and that extends over a sub-region of the cavity.

It can also be provided that an element is arranged in the inside of the cavity of the hollow light guide spaced from the light output device. This element is arranged between the light output device and a wall lying opposite the light output device and extending over a sub-region of the cavity and is fashioned reflective at that side facing toward the light output device and at that side lying opposite this side. The sub-region of the cavity between this element and the light output device thereby has at least one open side via which light can pass from the remaining cavity into this sub-region. The geometrical limitation of the light incidence produced by the element leads to a reduction of the luminous intensity in a sub-region of the light exit surface. As a result of this reflective formation at two sides, the light beamed into the cavity from the lamps can be largely completely utilized.

It can also be provided that the light intensity distribution curve in the region having reduced luminous intensity covers a larger angular range than in the region having higher luminous intensity.

It can also be inventively provided that the light output device is followed by a device that reduces the luminous intensity on a part of the light exit face, for example a partially absorbent foil or the like.

It can also be provided that a light exit face comprises a first region and a second region adjoining the first region wherein the emerging light has a different color than in the first region.

It can also be provided that a coloring device for producing a specific color of the light emerging from the light output device is provided in a sub-region of the light output device in the cavity and/or at the light output device.

It can also be provided that the light output device comprises a planar, light-transmissive element, particularly a foil or plate, that is entirely or partially coloring, for example due to a coloring coating or structuring, so that the coloring region of this element forms a sub-region of the light output device.

It can also be provided that a coloring element that modifies the color of the light incident onto a sub-region of the light output device is arranged in the cavity at a distance from the light output device. This element can, in particular, be a color-selective plate or foil that is arranged between the light output device and a wall lying opposite the light output device spaced from the light output device and that extends over a sub-region of the cavity.

It can also be provided that an element reflective on both sides is arranged in the inside of the cavity spaced from the light output device. The element is arranged between the light output device and a wall lying opposite the light output device and extends over a sub-region of the cavity. A side of this element facing toward the light output device is fashioned in a coloring fashion, which side, for example, is correspondingly coated or structured.

It can also be provided that the light output device or an element of the light output device is followed by a color-selective device that modifies the color of the emerging light on a part of the light exit face.

It can also be provided that the luminous intensity in the region of the light exit face is lower in a region wherein chromatic light is emitted than in a region wherein white light is emitted.

It can also be provided that the light output device comprises a sub-region without a light-refractive structure such as a prism structure as described above that deflects the passing light in a directed fashion.

It can also be provided that the light output device comprises a no light-refractive structure that deflects the passing light in a directed fashion in a sub-region and an element that limits the luminous intensity and/or creates a color light is arranged to be effective in the sub-region.

The invention can also provide that the lighting fixture comprises a plurality of regions offset in the direction of the axis of a lamp having different emission properties, and the lamp contributes to the light emission in only some of these regions.

In particular, it can be provided that the lamp extends only over a part of these regions.

The invention can provided that the light output device comprises at least one light-transmissive element having a boundary surface between two media with a different refractive index and the element is provided with a light-refractive structure that essentially prevents a light emission above a limit angle in at least one plane perpendicular to the light exit face so that a shielding of the light emerging at the light exit face is produced in this plane.

What is understood by a shielding is the lowering of the average luminous intensity of the light exit face above a limit angle relative to a perpendicular vis-a-vis the light exit surface below a predetermined limit value.

The invention can provide that the light-refractive structure or, respectively, the light-refractive structures of the light output device that, in particular, can be fashioned in plates or foils, comprises or is composed of line-shaped, light-refractive structural elements. These elements comprise sidewalls essentially parallel to the line direction that describe an angle at the free ends of the structural elements that is greater than 90° according to one embodiment and that preferably lies in a range from 90° through 130° for lighting fixtures having a shielding. According to a particular embodiment of the invention, the angle can lie in a range from 110° through 128°. The angular ranges of 90° through 130° or, respectively, 110° through 128° recited above are preferred especially for plates composed of a material having a refractive index of approximately 1.49, but the range can also be employed given materials having a different refractive index that is not all that different from 1.49. This applies to standard materials such as polymethylmethacrylate or glass. Fundamentally, however, the preferred angular ranges can be different for materials having a refractive index different from 1.49, and these preferred angular ranges for these refractive indices can be determined so that the same shielding angles are achieved for a predetermined limit value of the luminous intensity as in the above-recited angular range from 90° through 130° or, respectively, 110° through 128° given a refractive index of 1.49. According to the preferred embodiments, however, this angle should fundamentally be greater than 90° independently of the refractive index given lighting fixtures having a shielding. Preferably, this angle is the same at all structural elements that, moreover, can also have the same cross-sectional shape and, potentially, identical dimensions as well. For non-shielded light intensity distributions, the relevant angular ranges can be different, whereby the prism angle preferably differs from 90°.

The limit value of the luminous intensity can lie at 200 $cd/m^2$, 500 $cd/m^2$ or 1000 $cd/m^2$ for shielded lighting fixtures given the prevailing standards or, respectively, proposed standards. The shielding angle in standard applications lies in the range of more than 45°, preferably in a range from 50° through 75°, and more preferably in a range from 50° through 65°.

According to the preferred exemplary embodiment of the invention, the light-refractive elements have a constant cross-section along the line direction that, in particular, can assume the shape of a triangle. The sidewalls of the elements, however, need not be planar but can also be curved. Whereas the sidewalls according to a preferred embodiment directly adjoin one another at the free end of the structural elements, it can also be provided that the free end of the structural elements is flattened, and the sidewalls are connected by a planar or curved surface. In the case of planar lateral surfaces or lateral surfaces having a planar section at the free end, the aforementioned angle is then determined by the imaginary extension of the planar sidewalls or, respectively, of the planar sections of the sidewalls. In the case of curved sidewalls, the aforementioned angle can correspond to the angle of a triangle that the cross-section of the light-refractive elements optimally describes, i.e. with optimally little area deviation between the area of the triangle and the cross-sectional area of the light-refractive element. In the case of a convex, i.e. outwardly curved sidewall, this angle would be formed by the intersection angle of two tangents that are applied to the sidelines of the cross-section of the light-refracted element, whereas, given a concave, i.e. inwardly curved sidewall, this angle would be defined by two straight lines that are respectively placed between the head point and the foot point with a sideline of the cross-section, i.e. a line corresponding to the sidewall in cross-section.

It can be inventively provided that a light-refractive structure with line-shaped structural elements is respectively fashioned in two plates or foils arranged above one another. The lines that define the geometry of the structure of the first plate describe a non-disappearing angle with the lines that define the geometry of the structure of the second plate and preferably reside perpendicularly thereon.

Instead of the aforementioned, line-shaped structures, other light-refractive structures can also be employed, for example structures shaped like a truncated pyramid as disclosed, for example, by U.S. Pat. Nos. 5,396,350 and 5,555,109. The light-refractive structure also need not necessarily produce a shielding but, for example, can influence the position of the maximum of the light intensity distribution curve given a wide-angle lighting fixture.

The light-refractive structures can, for example, be manufactured in that a plate or foil of a standard light-transmissive material such as glass, polyester, polystyrol, polycarbonate, PET or polymethylmethacrylate is correspondingly processed or shaped on a surface. Alternatively, a foil that contains the light-refractive structure can be glued onto such a plate.

Further features and advantages of the invention are derived from the following detailed description of the exemplary embodiments, the drawings and claims.

BRIEF DESCRIPTION OF THE DRAWINGS

FIG. 4b is a cross-sectional view taken along line IVb—IVb of FIG. 4a;

FIG. 4c is a cross-sectional view taken along the line IVc—IVc of FIG. 4a;

DESCRIPTION OF THE PREFERRED EMBODIMENTS

Figure 1:
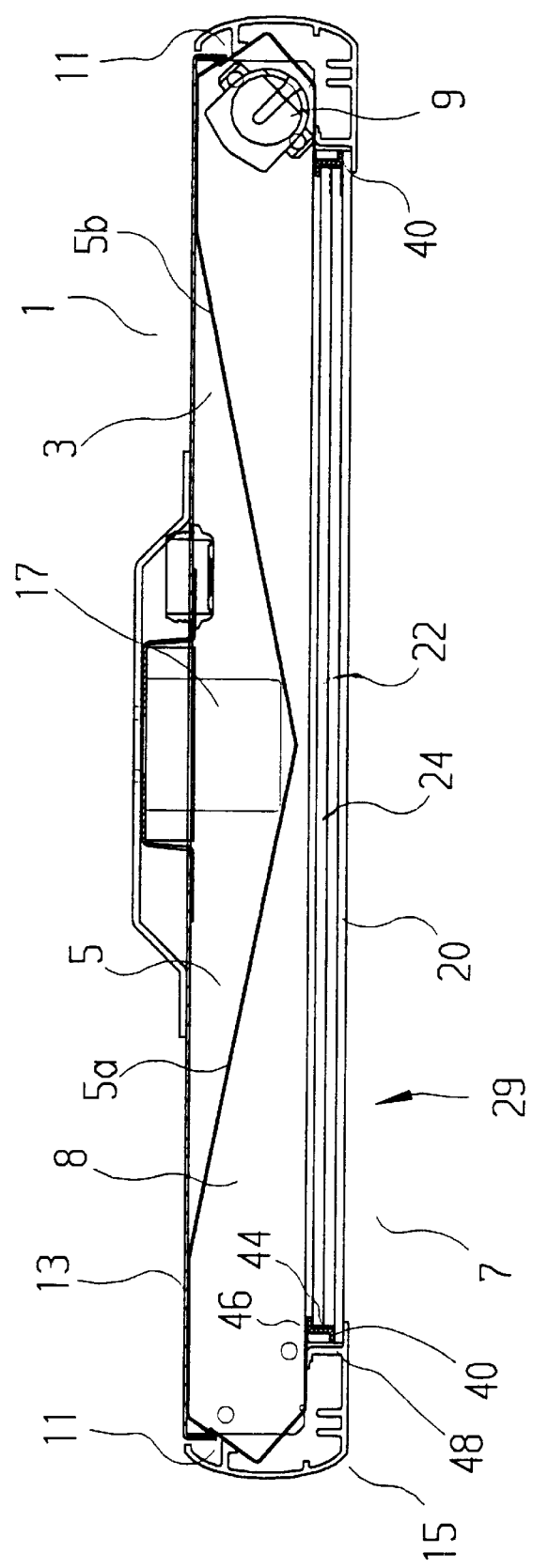
FIG. 1 is an exemplary, schematic cross-sectional view of an inventive lighting fixture.

The principle of a hollow light guide lighting fixture is first explained below with reference to FIGS. 1 through 3. FIG. 1 represents an exemplary cross-section of an inventive lighting fixture in a plane perpendicular to the lamp axis. This cross-section, just like the light-oriented elements shown in FIGS. 1 through 3, can be differently fashioned in different regions of the lighting fixture, as shall be explained later in greater detail. Insofar as nothing to the contrary is said, identical component parts or component parts having an equivalent effect are provided with the same reference characters.

The lighting fixture shown in FIG. 1 comprises a housing 1 in which a hollow light guide 3 is arranged. The hollow light guide 3 is composed of a reflective roof wall 5 that comprises two halves 5a and 5b inclined relative to one another at an obtuse angle in the region of the illustrated cross-section, reflective face or end walls (not shown) at the two end faces as well as a light output device 7 that is described later in greater detail. The face walls, the roof wall 5 and the light output device 7 together define a cavity 8 with reflective walls.

The hollow light guide 3 is respectively opened at the two narrow sides. A respective lamp 9 (only shown at one side) is arranged at one of these open narrow sides, and the lamp couples light into the hollow light guide 3 via an input reflector 11.

The housing 1 is composed of an upper housing half 13 to which the roof wall 5 is secured as well as of side ledges 15 which overlap the hollow light guide and edge portions of the light output device 7 from below to hold the light output device on the hollow light guide 3. A ballast device 17 is secured to the upper housing part 13. The ballast device 17 extends into the region above the hollow light guide 3 wherein the two roof halves 5a and 5b have a reduced spacing from the light output device 7 and, accordingly, define an enlarged spatial region in the housing above the hollow light guide 3, so that a relatively slight structural height can be achieved overall. This feature of a slight structural height is advantageous particularly given add-on or pendulum.

The light output device is composed of a carrier plate 20 on which two pairs of quadratic prism plates 22 and 24 are arranged above one another. The carrier plate forms the light output surface of the light output device 7 that coincides with the light exit face 29 in the case of this light. The prism plates are provided with a prism structure on a base area that generates a shielding of the light emerging via the light output device and that is explained in greater detail below for the prism plates 22 and 24.

The prism plates 22 and 24 are provided with a structure that essentially prevents a light output above a limit angle relative to the perpendicular vis-a-vis the light exit face in specific planes and thereby produces a shielding, a lowering of the average luminous intensity of the light exit face below a limit value, for example 200 cd/m², 500 cd/m² or 1000 cd/m², as required in the applicable standards or, respectively, proposed standards for picture screen workstations.

Figure 2:
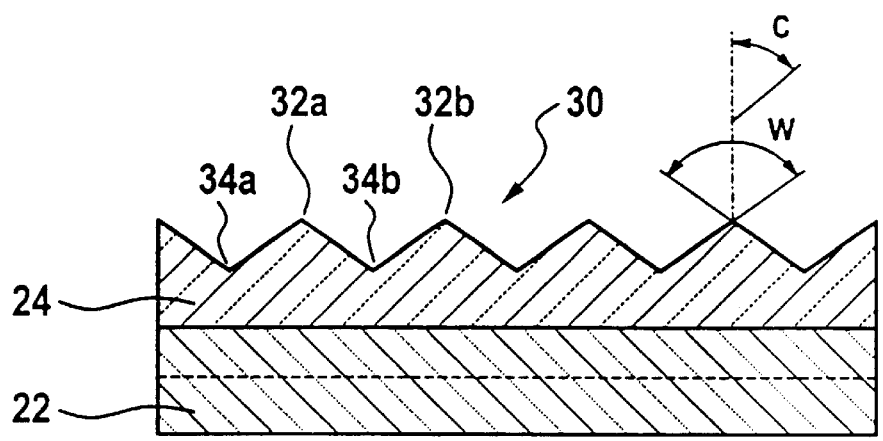
FIG. 2 is an enlarged cross-sectional view of a pair of prism plates.

At its side facing toward the cavity 8, the prism plate 24 comprises a structure of parallel prisms 30 that have a triangular shape in a cross-section perpendicular to their longitudinal axis, as can be seen with reference to FIG. 2. FIG. 2 shows that the prisms directly adjoin one another, comprise ridges 32a, 32b, . . . , which are collectively referred to as 32 and are uniformly spaced from one another and are separated from one another by depressions 34a, 34b, . . . , which are collectively referred to as 34 and are uniformly spaced from one another. The depressions 34 and the ridges 32 form straight, parallel lines at that side of the plate 24 facing toward the cavity 8.

The shielding can, for example, be produced by total reflection in the prisms. Light in the prisms, given incidence on the boundary surface to an optically thinner medium, for example air, is completely reflected back into the prisms when the incident angle is greater then the angle of the total reflection. Accordingly, the exit angle for the boundary surfaces of the prisms is limited. The side walls of the prisms between the ridges 32 and the depressions 34, however, reside obliquely relative to the light exit face, so that the limitation of the light exit angle by the limit angle of the total reflection does not necessarily provide a shielding. One possible criterion for a shielding can be derived in that the exit angle with respect to a perpendicular relative to the base area of the light-refractive structure is maximally equal to the shielding angle for beam paths in the prism up to a predetermined maximum number k (for example, k=1, 2, 3 or 4) of internal reflections in the prisms before a light exit from the structure. Other shielding mechanisms or shielding criteria can also be alternatively or additionally employed.

It has been shown that a good shielding is achieved for prisms having a cross-section in the form of an equilateral triangle when the following relationships exist between the shielding angle C and the prism angle w for a boundary surface to air $$w/2 \leq C \tag{1}$$

$$w \geq 2(2 \arcsin(1/n)+90)/3 \tag{2}$$

$$\tan(w/2) \leq (n \sin(\arcsin(1/n)-3 \ w/2)+\cos(w/2))/(n \cos(\arcsin(1/n)-3 \ w/2)+\sin(w/2)), \tag{3}$$

whereby n is the refractive index of the plate 24.

The prism angle w given the currently preferred embodiments with a refractive index of 1.49 lies in the range from 90° through 130°, and preferably in the range from 110° through 128°.

Instead of the triangular prisms shown in FIG. 2, other prism shapes can also be employed.

The prism plate 22, like the plate 24, is provided with a structure of parallel, straight line prisms 36 that comprise ridges 38a, 38b, . . . , which are collectively referred to as 38, and that are separated from one another by depressions 39a, 39b, . . . , which are collectively referred to as 39. Just like the prisms 30, the prisms 36 produce a shielding in the direction transversely relative to their longitudinal axis, whereby the relationships (1) through (3) can be particularly satisfied. As can be seen with reference to FIGS. 2 and 3, the longitudinal direction of the prisms 30 is perpendicular to the longitudinal direction of the prisms 36. Together, the prism plates 22 and 24 therefore generate a shielding in planes perpendicular relative to one another that reside perpendicularly on the light exit face 3. In this way, a shielding is produced in at least two planes. The shielding angle C can be different in these two planes. Accordingly, the prisms 30 and 36 can also exhibit a different prism angle w.

As can be seen in FIG. 1, the prism plates 22 and 24 are held on a carrier plate 20 at their outsides by frame elements 40 that proceed all around. The frame element 40 comprises a central section 44 at which flanges 46 and 48 adjoin at a right angle at both edges or ends, and these flanges are directed in opposite directions. The flange 48 is glued on the plate 20. The flange 46 overlaps the plates 22 and 24 and thereby holds these positively locked against the carrier plate 20. Overall, the four frame elements 40 form a frame for the two plates 22 and 24 that holds these against the carrier plate 20. The carrier plate 20, the prism plates 22 and 24 as well as the frame elements 40 form a pre-fabricated unit that is introduced into the opening of the hollow light guide 3 and is held at the hollow light guide by the lateral ledges 15. The plates and the appertaining prism structures are thereby aligned correctly relative to one another by the frame 40 and by the fixing against the carrier plate 20.

The light from the lamp 9 or, respectively, the input reflector 11 is partly incident directly onto the plate 24. A part of this light passes through the plates 22 and 24 and emerges at the light exit face 29. Another part of the light is reflected at the plate 22. The roof wall 5 reflects the light directly incident onto it from the lamp 9 or, respectively, from the input reflector 11 and also reflects the light reflected back onto it by the plate 24 downward to the light output device 7.

The degree of the light output by the prism plates 22 and 24 is dependent, among other things, on the incident angle of the incident light rays. It has been shown that a more uniform light intensity distribution curve of the lighting fixture can be achieved when the reflective roof wall is inclined relative to the light output device and when the distance between the light output device and the roof wall is reduced in the direction away from the lamp. In particular, the light intensity distribution curve is thereby rendered more uniform in the region of 0°, and a minimum of the light intensity distribution is avoided in this region or attenuated. It has also been shown that such a design leads to an improvement of the efficiency of the lighting fixture. The roof wall 5 is therefore composed of two straight sections 5a and 5b inclined relative to one another so that the height of the cavity 8 is smallest in the middle and greatest at the outer edge.

Figure 3:
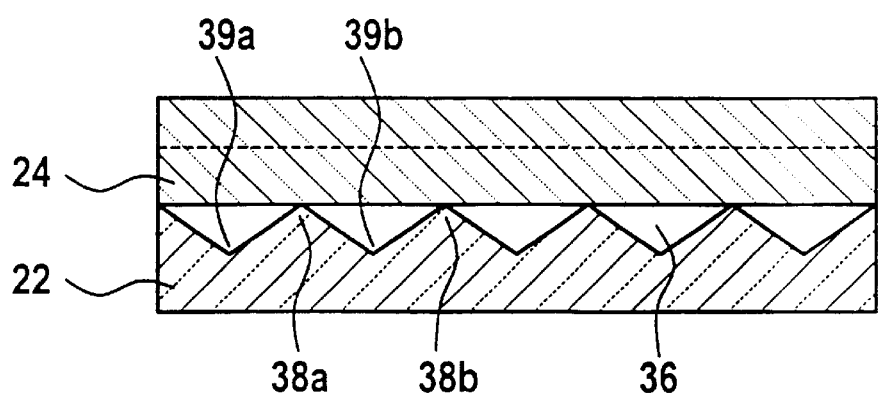
FIG. 3 is an enlarged cross-sectional view of the pair of prism plates of FIG. 2 in a direction perpendicular to the cross-sectional view of FIG. 2.

In the above description of FIGS. 2 and 3, the plates 22 and 24 are arranged with a flat surface facing away from the roof wall 5. However, in FIG. 1, the plates 22 and 24 are rotated by 180° so that the plate 24 is between the plates 22 and 20 and the prisms 30 and 36 point or face away from the roof wall 5.

Figure 4B:
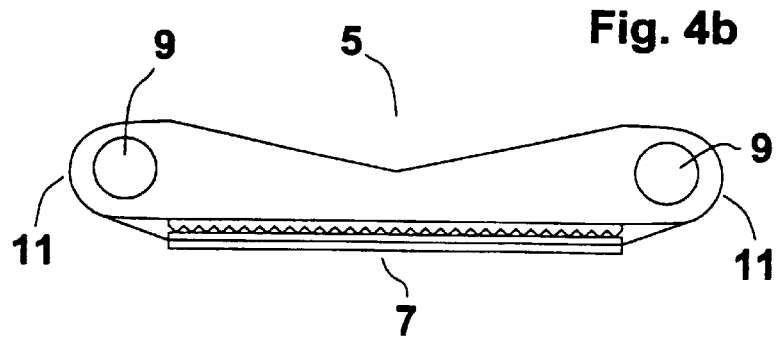
Figure 4A:
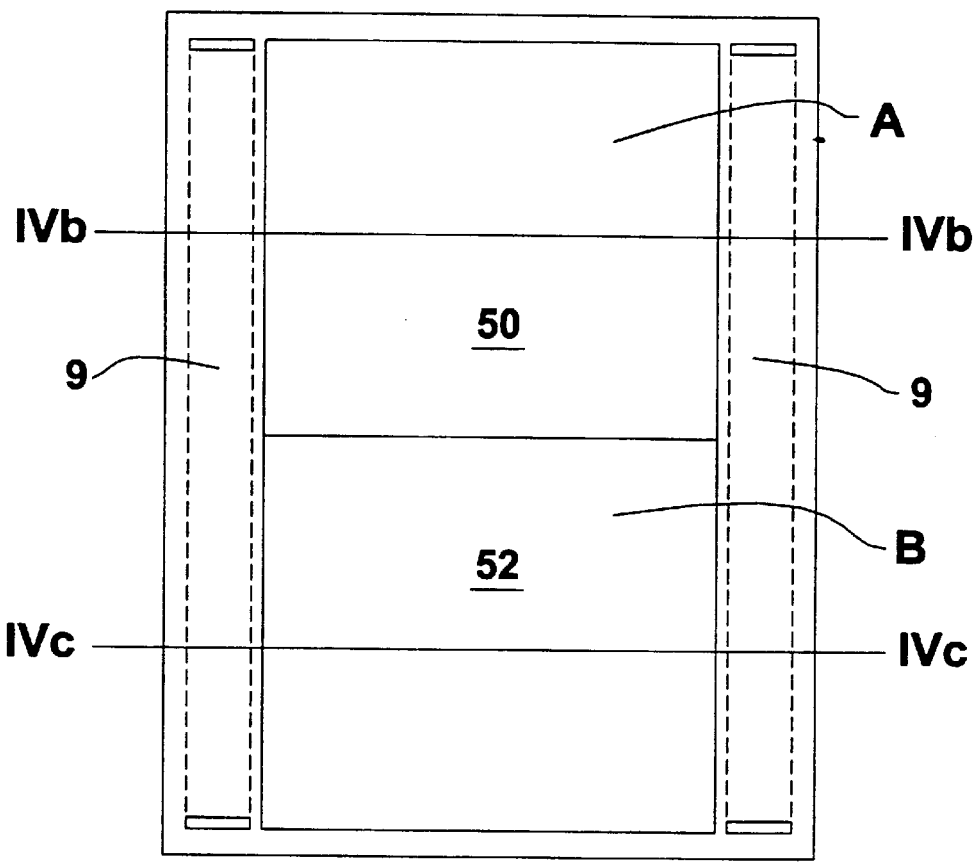
FIG. 4a is a bottom plan view of a first embodiment of an inventive lighting fixture.
Figure 4C:
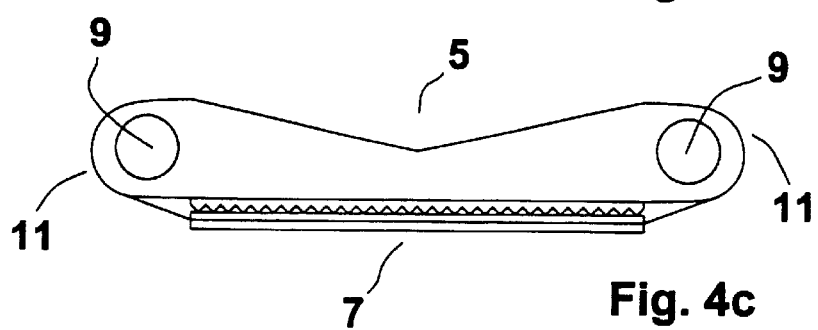

As was mentioned above, the hollow light guide can be differently fashioned in different regions. FIGS. 4a through 4c show an embodiment of an inventive lighting fixture which has two lamps 9 wherein the light output device is differently fashioned in different regions A and B. In FIG. 4a, the two reference characters 50 and 52 respectively reference a pair of prism plates lying above one another. Each pair of plates have a structure of parallel, straight-line prisms having triangular cross-section with the direction of the lines in the upper plate being perpendicular to the direction of the lines in the lower plate. The prism plates of the pair 50 differ from those of the pair 52 on the basis of the prism angle. Whereas, given a refractive index of 1.49, the prisms of the prism plate pair 50 comprise prism angles that lie in the range from 110° through 128°, the prism angles in the prism pair 52 lie between 60° and 75° or, between 115° and 175°, and preferably between 145° and 175°. The prisms of the prism plate pair 50 produce a shielded light intensity distribution curve and the prisms of the prism pair of 52 produce a light intensity distribution curve that has a narrow-angle in the first angular range of 60° to 75° or a wide-angle in the second set of angular ranges of 115° to 175° and 145° to 175° that is not shielded or only slightly shielded and has a minimum in the region of 0°. FIGS. 4b and 4c respectively show a cross-sectional along the lines IVb—IVb and IVc—IVc, whereby this cross-section merely schematically shows the arrangement of the remaining light fixture components in the hollow light guide. It can be seen that the hollow light guide, apart from the different prism plate pairs 50 and 52, is identically structured in the two regions. The two prism plate pairs 50 and 52 can be held at a carrier plate 20 by a frame 40 that proceeds around their outside edge, as was explained above. The two prism plate pairs can also be respectively held at the carrier plate 20 by a separate frame that respectively surrounds them at all four sides.

The shape and size of the regions A and B can be essentially arbitrary selected according to the respective light-oriented task.

Figure 5B:
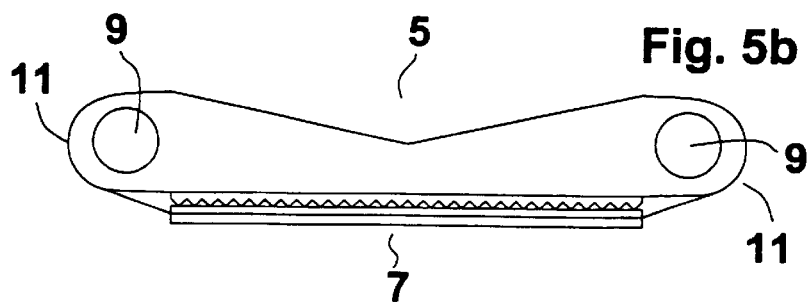
FIG. 5b is a cross-sectional view of the lighting fixture of FIG. 5a taken along the line Vb—Vb.
Figure 5A:
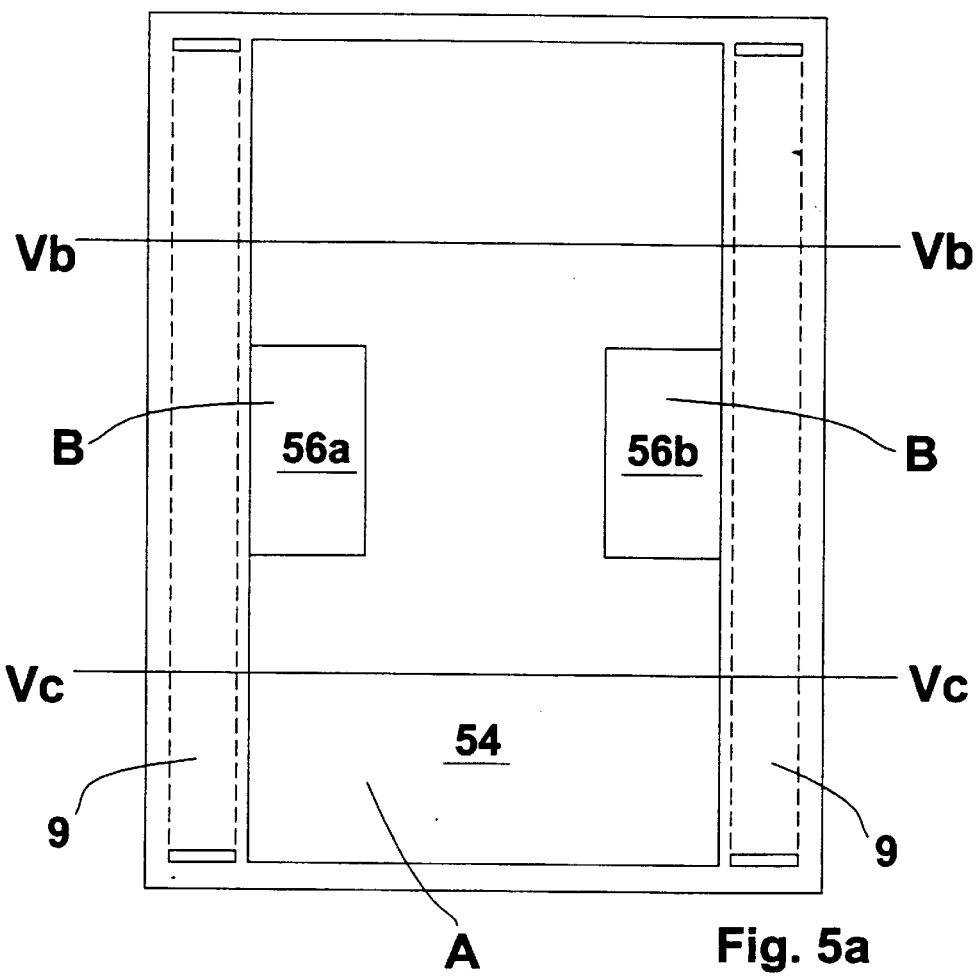
FIG. 5a is a bottom plan view of a second embodiment of an inventive lighting fixture.
Figure 5C:
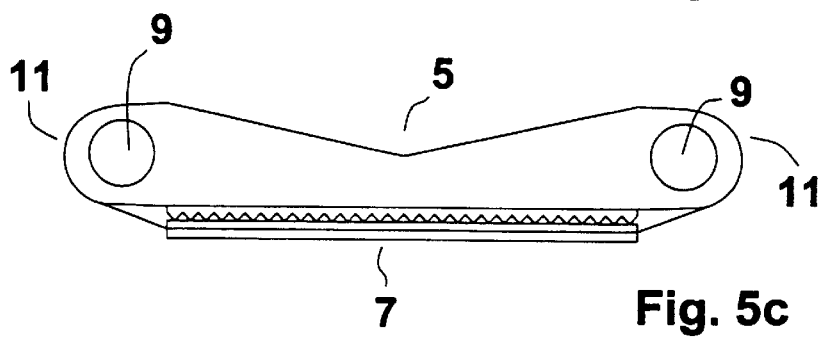
FIG. 5c is a cross-sectional view of the lighting fixture of FIG. 5a taken along the line Vc—Vc.

FIGS. 5a through 5c show a modified embodiment of the embodiment according to FIGS. 4a through 4c with a region A and two regions B with a different prism structure. Here, one prism plate pair 54 extends over the entire light exit face of the lighting fixture except for two sub regions at the left and right edge that have a recess into which the prism plate pairs 56a and 56b are introduced. The prism plates of the prism plate pairs 54 and 56a or, respectively, 56b are in turn fashioned as explained above with reference to FIGS. 2 and 3. They respectively comprise parallel, line-shaped prisms having a triangular cross-section, whereby the prisms of the one plate reside perpendicularly relative to those of the other plate. The prisms of the prism plate pair 54 again have a prism angle in the range from 110° through 128°, whereas the prisms of the prism plate pairs 56a and 56b comprise prism angles in the range from 60 through 75° or a range from 115° through 175°.

Figure 6B:
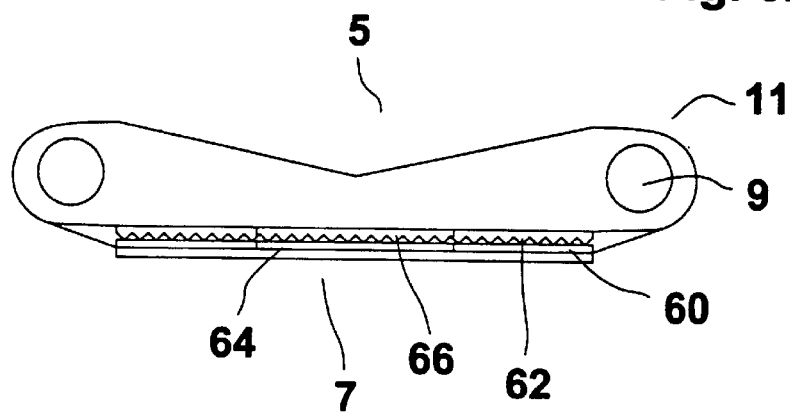
FIG. 6b is a cross-sectional view of the lighting fixture of FIG. 6a taken along the line VIb—VIb.
Figure 6A:
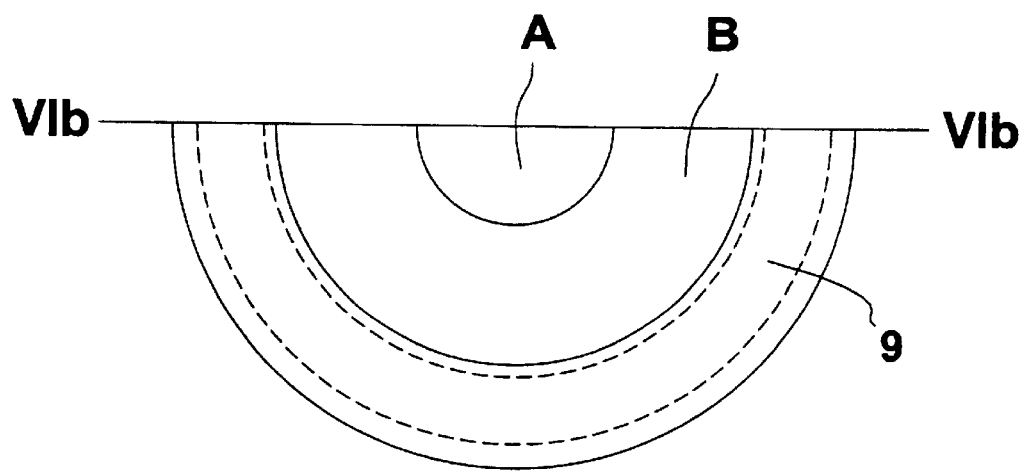
FIG. 6a is a bottom plan view of a third embodiment of an inventive lighting fixture.

FIGS. 6a and 6b show an exemplary embodiment for a round or circular lighting fixture. The lamp 9 in this case is an annular lamp and the reflective roof wall 5 has a conical form. The light output device in this case is composed of a pair of annular prism plates 60 and 62 that form the region B as well as of a pair of circular disk-shaped prism plates 64 and 66 that are introduced in the central opening of the prism plates 60 and 62 and form the region A. The prism plate 60 through 66 respectively comprise a structure at a base surface having line-shaped prisms with a triangular cross-section, similar to that shown in FIGS. 2 and 3. Due to the rotational symmetry of the lighting fixture in this exemplary embodiment, the prisms of the prism plates 62 and 66 are annularly fashioned, and the prisms of the prism plates 60 and 64 are star-shaped, so that the lines of the prisms of the prism plates 60 and 64 reside perpendicularly relative to the corresponding lines of the plates 62 and 66. Alternatively, the prisms can also be respectively straight-line, as was explained with reference to FIGS. 2 and 3. The prisms of the prism plates 64 and 66 again comprise a prism angle in the range from 110° through 128°, whereas the prisms of the prism plates 60 and 62 comprise a different prism angle, for example in the range from 60° through 75°, so that the region of the prism plates 64 and 66 generates a shielded light intensity distribution and the two prism plates 60 and 62 produce a narrow-angle light intensity distribution, as described above. The region of the prism plates 64 and 66 is thereby completely surrounded by the region of the prism plates 60 and 62. This can also be the case given a rectangular light exit face.

Figure 7B:
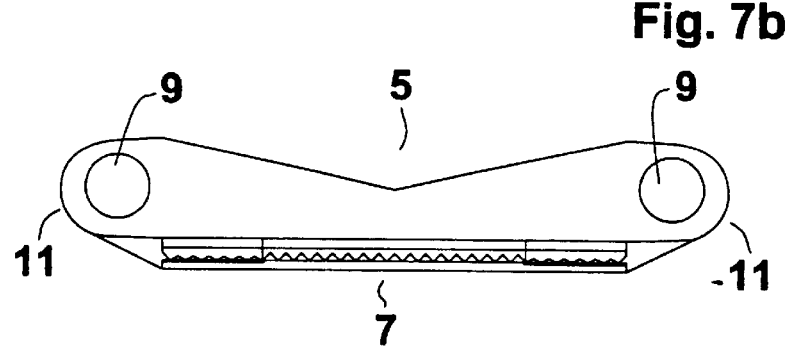
FIG. 7b is a cross-sectional view of the lighting fixture of FIG. 7a taken along the line VIIb—VIIb.
Figure 7A:
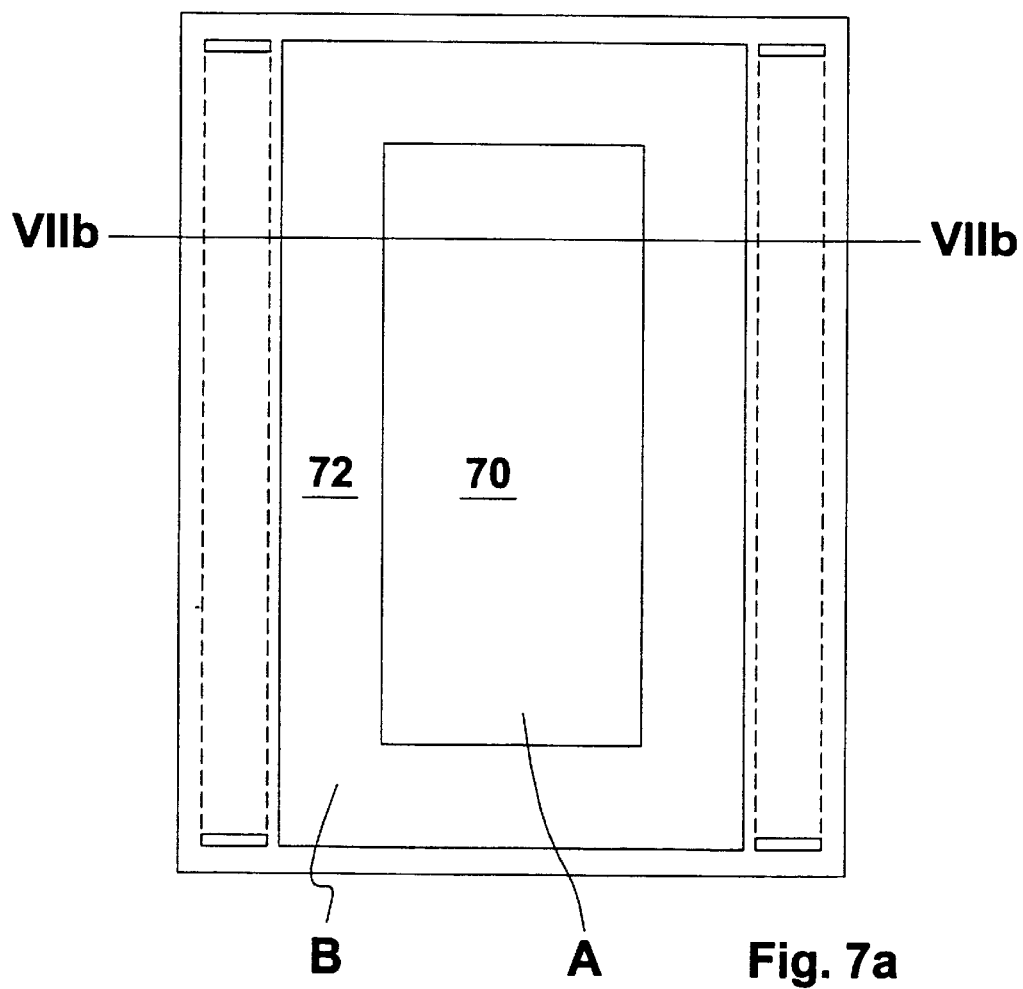
FIG. 7a is a bottom plan view of a fourth embodiment of the inventive lighting

FIGS. 7a and 7b show an exemplary embodiment having a rectangular light exit face with a prism plate pair 70 in the region A whose prisms are fashioned and aligned as described above with reference to FIG. 4a for the prism plate pair 50. The pair 70 is surrounded by a prism plate pair 72 in the region B whose prisms are fashioned and directed like the prisms of the prism plate pair 52, as described above with reference to FIG. 4a.

Figure 8B:
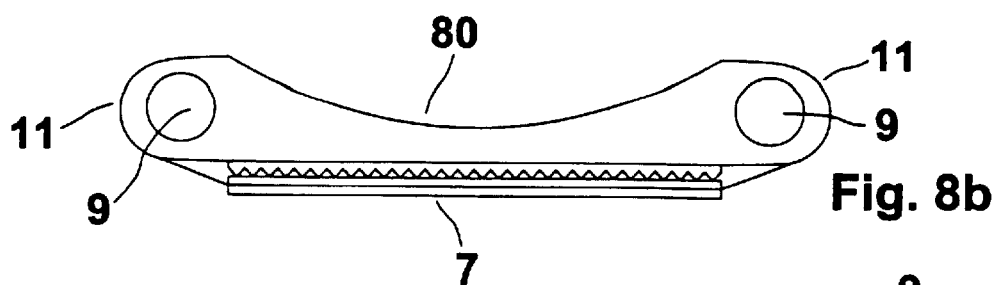
FIG. 8b is a cross-sectional view of the lighting fixture of FIG. 8a taken along the line VIIIb—VIIIb.
Figure 8A:
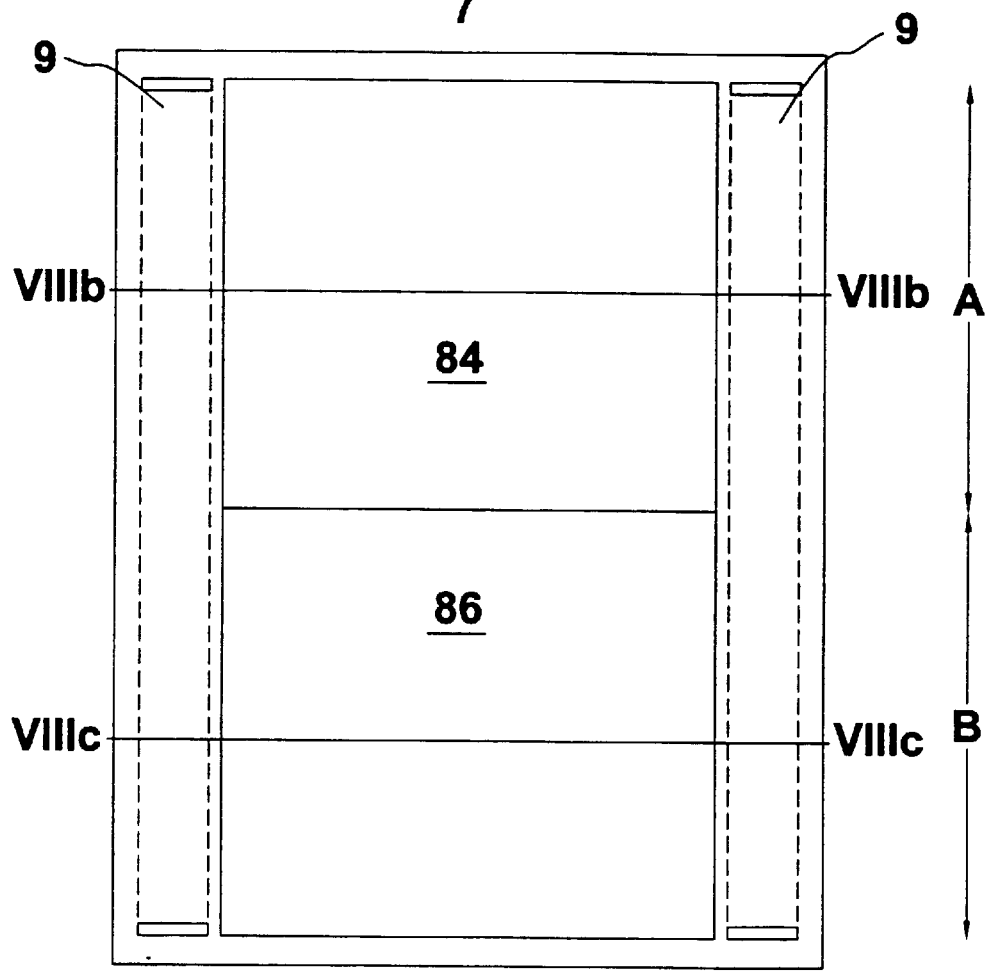
FIG. 8a is a bottom plan view of a fifth embodiment of an inventive lighting fixture.
Figure 8C:
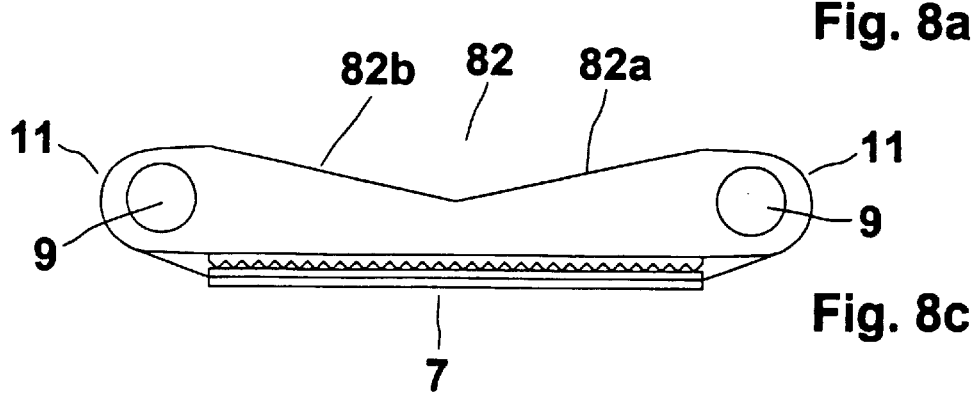
FIG. 8c is a cross-sectional view of the lighting fixture of FIG. 8a taken along the line

FIGS. 8 through 8c show another embodiment of an inventive lighting fixture. This embodiment of the lighting fixture has two regions with a different reflective roof wall. In the region A, the roof wall 80 as viewed from the side of the cavity 8 is curved convexly inward, whereas the roof wall 82 in the region B is composed of two planar halves 82a and 82b inclined relative to one another at an obtuse angle, as was explained above with reference to FIG. 1. This different design of the roof wall can be accompanied by a different fashioning of the prism plates of the light output device. It is shown in FIG. 8a that the light output device is composed of two prism plate pairs 84 and 86, whereby the prisms of the pair 84 are fashioned and aligned relative to one another as was explained above for the prism plate pair 50 of the exemplary embodiment according to FIG. 4a, whereas the prism structures of the plates of the pair 86 are fashioned and aligned like the prisms of the plates of the pair 52 according to the exemplary embodiment of FIG. 4a. In particular, the prism plates of a prism plate pair 84 have a prism angle in the range from 110° through 128°, and the prisms of the plates of the pair 86 have a prism angle in the range from 60° through 75°. The prism angles of the pairs 84 and 86 can also be the same, whereby the different roof walls 80 and 82 in this case leads to a different light intensity distribution curve.

Figure 9B:
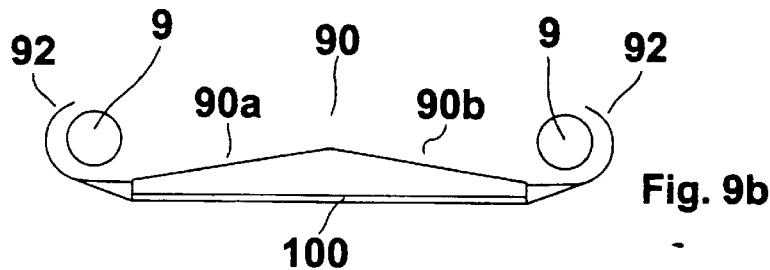
FIG. 9b is a cross-sectional view of the lighting fixture of FIG. 9a taken along the line IXb—IXb.
Figure 9A:
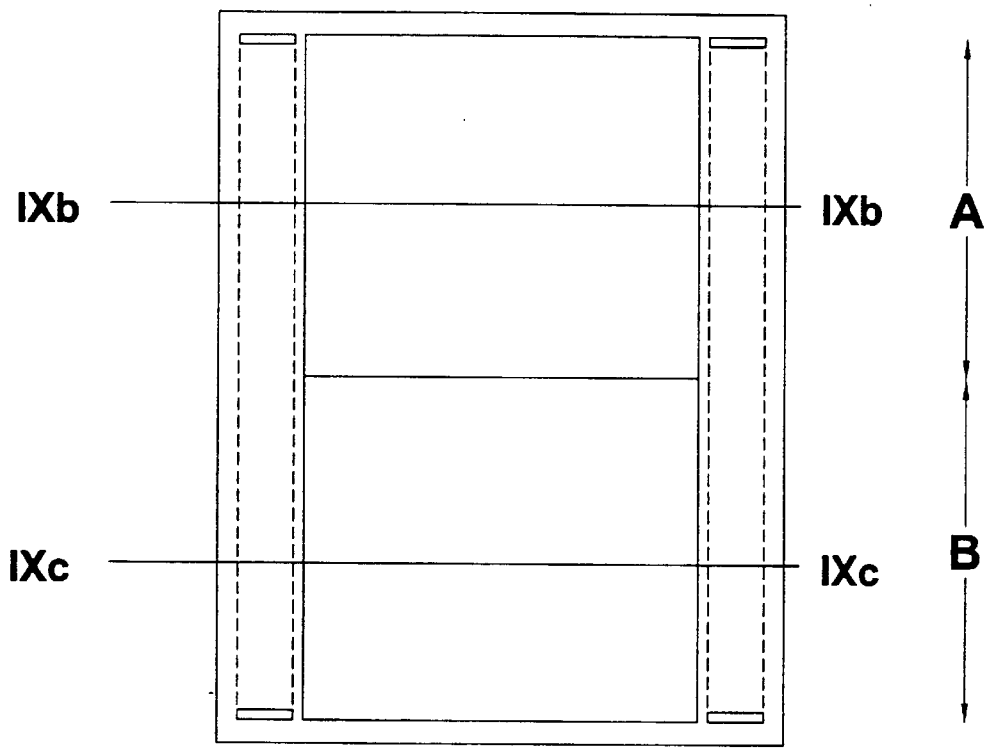
FIG. 9a is a bottom plan view of a sixth embodiment of an inventive lighting fixture.
Figure 9C:
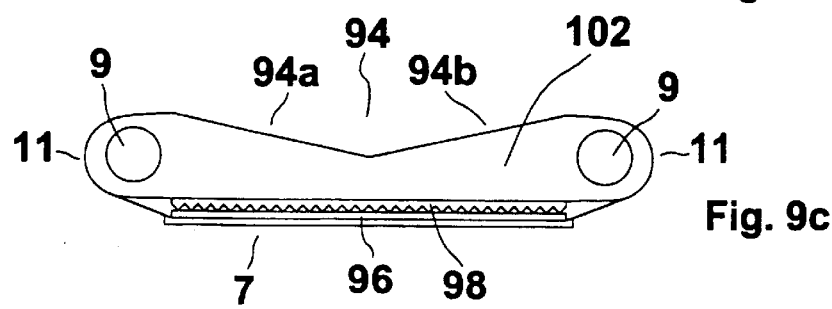
FIG. 9c is a cross-sectional view of the lighting fixture of FIG. 9a taken along the line IXc—IXc.

FIGS. 9a through 9c show an exemplary embodiment of an inventive light fixture, whereby a different design of the roof wall leads to different direct and indirect parts being output in different regions of the light fixture. In the region A (cross-section IXb—IXb), the roof wall 90 is composed of two planar sections 90a and 90b extending obliquely upward whose inside and outside surfaces are fashioned reflective. Light from the lamps 9 is beamed onto the outside of a wall section and is reflected for the output of an indirect light part. The input reflectors 92 are thereby fashioned so that a part of the light of the light fixtures can also simultaneously emerge without reflection for outputting an indirect light part.

In the region B (cross-section IXc—IXc), in contrast, the roof wall 94 is fashioned as described above with reference to FIG. 1 of two inwardly inclined, planar sections 94a and 94b onto whose reflective insides the lamps beam light. In the region of the cross-section IXc—IXc the light output device is composed of two prism plates 96 and 98 that are fashioned and aligned as described above with reference to FIGS. 2 and 3 for the prism plates 22 and 24. In the region of the cross-section IXb—IXb, in contrast, the light output device is composed of a simple plate 100 that can be fashioned with an irregular, diffusely scattering structure or the like for better light output. The roof walls 90, 94 and the plates 96, 98 and 100 thereby form a hollow light guide having a continuous cavity 102, so that light can enter from the region B into the region A and can emerge via the plate 100. In a modification of the illustrated light fixture, the plate 100 can also be potentially omitted. It can likewise be provided that the hollow light guide does not extend beyond the region B and comprises a reflective wall in the boundary region between the sections A and B, so that light from this region does not enter into the region A. In this case, no direct light part is output in the region The plate 100 can then be potentially retained as a cover plate.

The roof wall 90 or, respectively, 94 can also be fashioned partially transmissive, so that a part of the light of the lamps 9 in the region A enters into the cavity of the hollow light guide via the walls 90a and 90b and, on the other hand, a part of the light in the region B is output via the walls 94a and 94b, this contributing to the indirect light part of the light fixture.

Figure 10B:
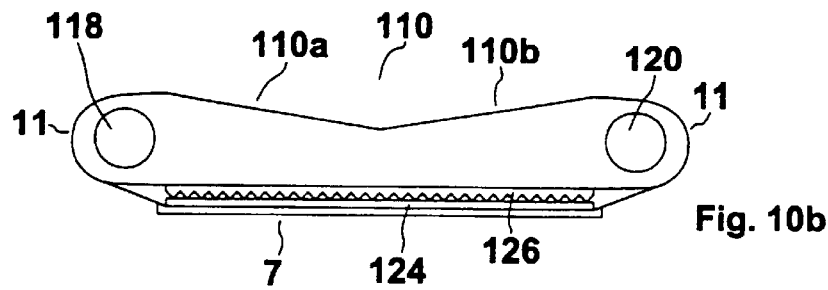
FIG. 10b is a cross-sectional view of the lighting fixture of FIG. 10a taken along the line Xb—Xb.
Figure 10A:
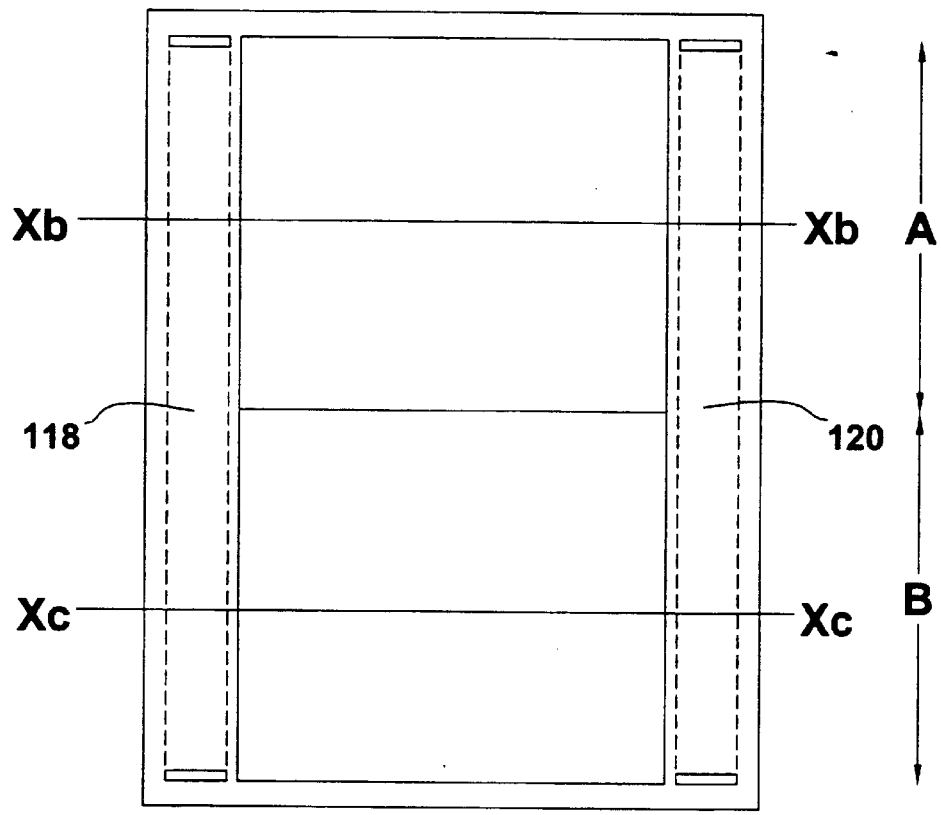
FIG. 10a is a bottom plan view of a seventh embodiment of an inventive lighting fixture.
Figure 10C:
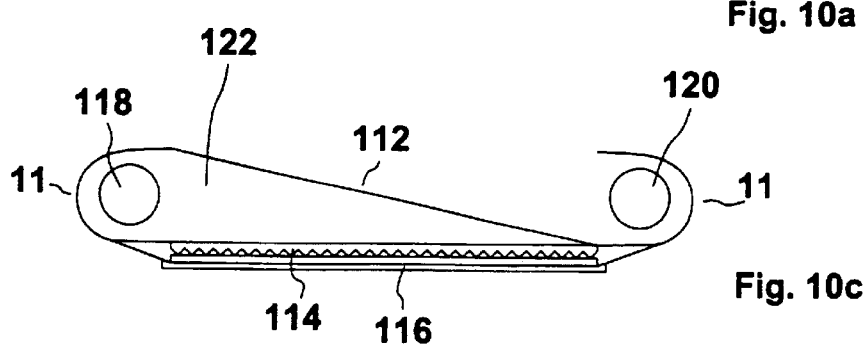
FIG. 10c is a cross-sectional view of the lighting fixture of FIG. 10a taken along the line Xc—Xc.

FIGS. 10a through 10c show a modification of the embodiment according to FIGS. 9a through 9c, whereby the roof wall 110 in the region A is fashioned with two inwardly inclined planar sections 110a and 110b, whereas the roof wall 112 in the region B forms a planar surface that is inclined relative to the prism plates 114 and 116 and attaches wedge-shaped to these prism plates at one side. The roof wall 112 is fashioned reflective at its inside and outside surfaces. In the region B, it reflects the light of the lamp 118 to the prism plates 114 and 116, whereas it reflects the light of the lamp 120 away from the cavity 122 for outputting an indirect light part. In the region A, in contrast, the light of the lamps 118 and 120 is respectively reflected to the corresponding prism plates 124 and 126 by the two roof wall sections 110a and 110b, so that a direct light part is output via the prism plates 114 and 116 or, respectively, 124 and 126 over the entire length of the light fixture, and an indirect light part by reflection of the light of the lamp at the wall 112 is additionally output in the region B, whereby the light intensity distribution of the direct part in the region A is symmetrical and is asymmetrical in the region B with respect to a plane parallel to the lamps 118 and 120. The plates 114 and 116 or, respectively, 124 and 126 are fashioned and aligned relative to one another as described above with reference to FIGS. 2 and 3. In order to design the light intensity distribution over the light exit face, the prism angle at the two plates 114 and 116 can differ from that of the two plates 124 and 126.

Figure 11A:
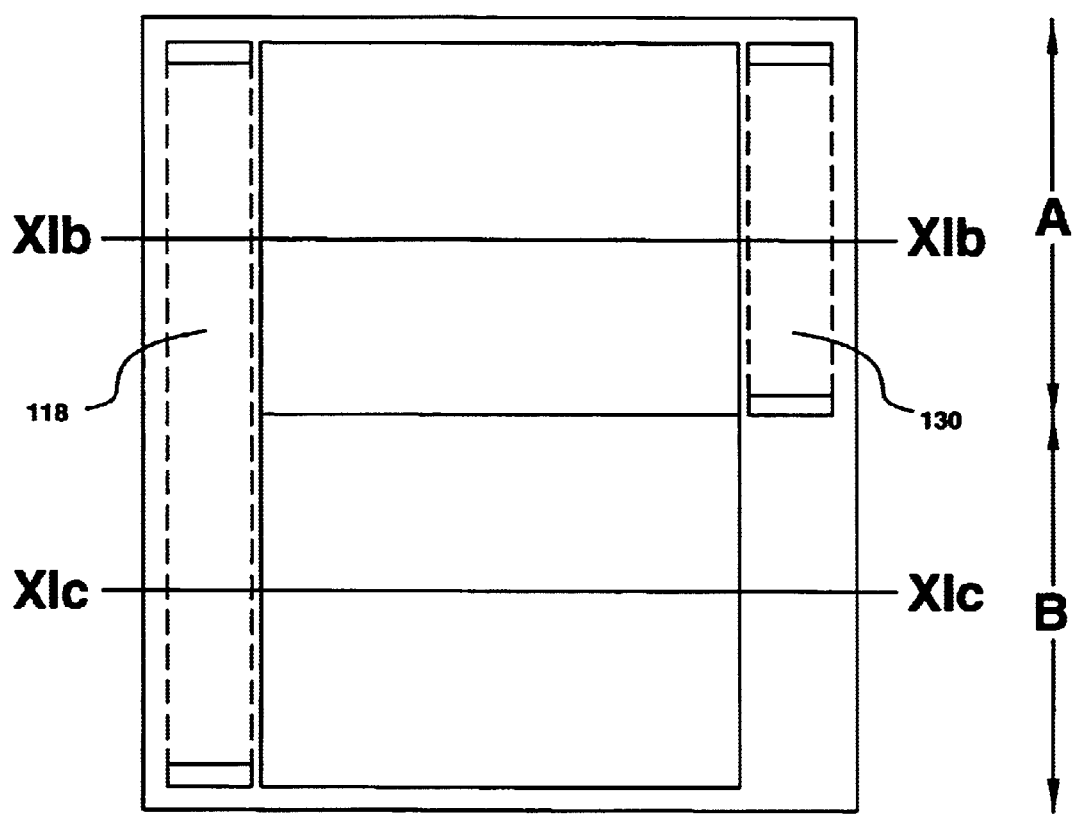
FIG. 11a is a bottom plan view of an eighth embodiment of an inventive lighting
Figure 11B:
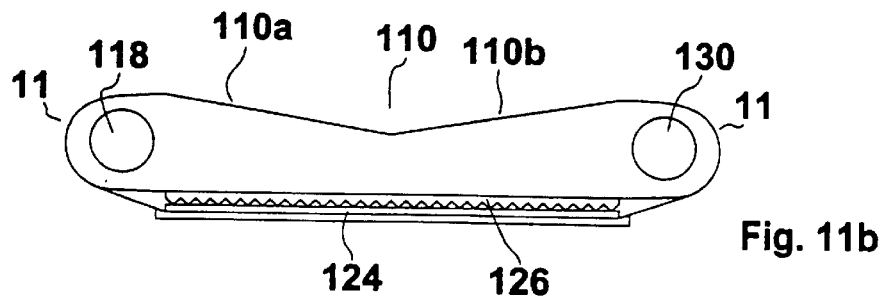
FIG. 11b is a cross-sectional view of the lighting fixture of FIG. 11a taken along the line XIb—XIb.
Figure 11C:
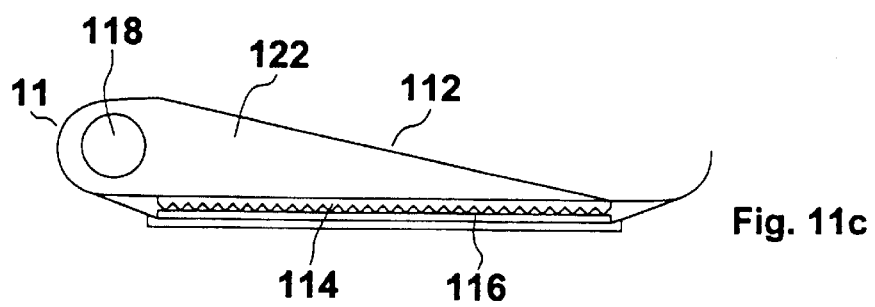
FIG. 11c is a cross-sectional view of the lighting fixture of FIG. 11a taken along the line XIc—XIc.

FIGS. 11a through 11c show a modification of the exemplary embodiment of FIG. 10, whereby one of the two lamps, namely the lamp 130, only extends over the length of the region B and only a single lamp is present in the region A. The remaining component parts correspond to the component parts of the exemplary embodiment according to FIGS. 10a through 10c and are referenced with the same referenced characters.

Figure 12B:
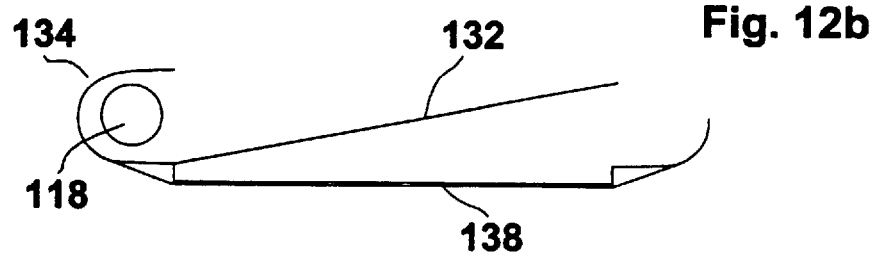
FIG. 12b is a cross-sectional view of the lighting fixture of FIG. 12a taken along the line XIIb—XIIb.
Figure 12A:
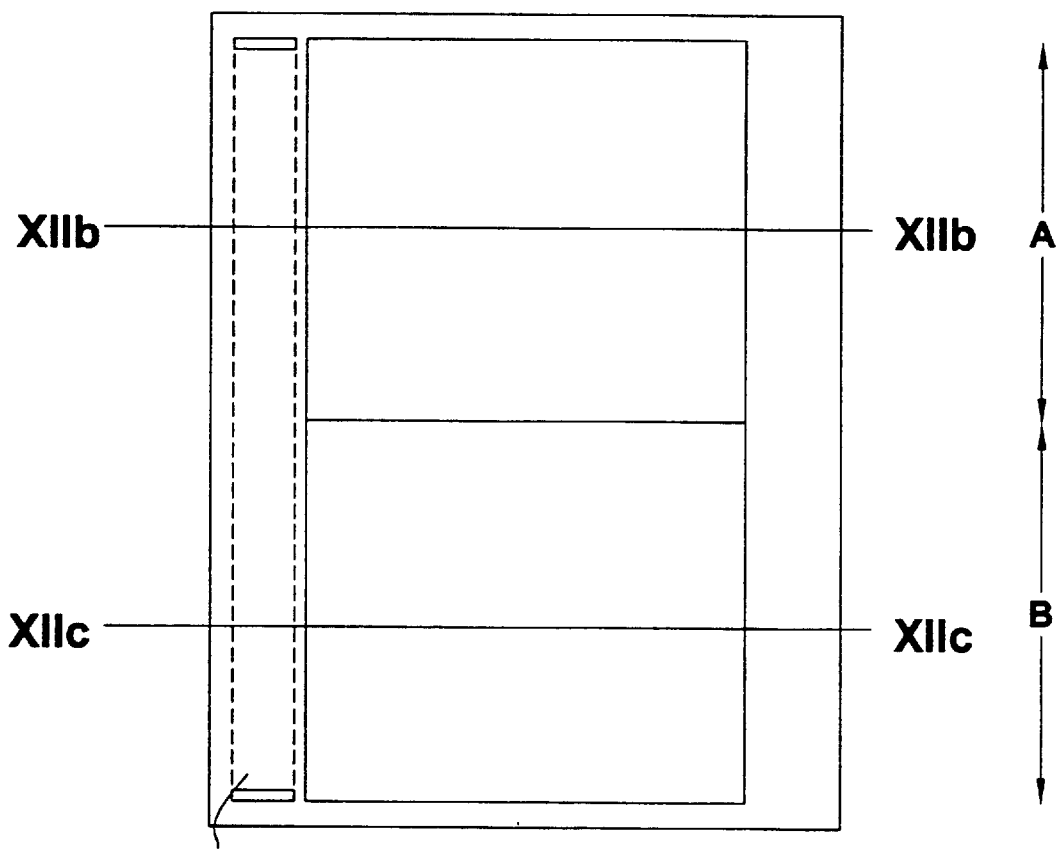
FIG. 12a is a bottom plan view of a ninth embodiment of an inventive lighting fixture.

FIGS. 12a through 12b show a modification of the exemplary embodiment according to FIG. 9, whereby a reflective roof wall 132 in the region A extends obliquely upward from the lower edge of the input reflector 134 allocated to the lamp 118, so that the light of the lamp 118 is reflected up for outputting as an indirect part by the wall 132. However, a roof wall 136 in the region B extends obliquely down from the upper edge of the input reflector 134 and adjoins wedge-shaped at the prism plates 96 and 98 at an acute angle. The lamp 118 outputs its light in this region into the hollow light guide formed by the wall 136 and the light is output therefrom via the prism plates 96 and 98. The hollow light guide in the region B can be open toward the region under the roof wall 132, so that a direct light part is also output from the region A via the transparent plate 138, or the hollow guide can be closed relative to the region A, as was explained above with reference to FIGS. 9a through 9c.

Figure 12C:
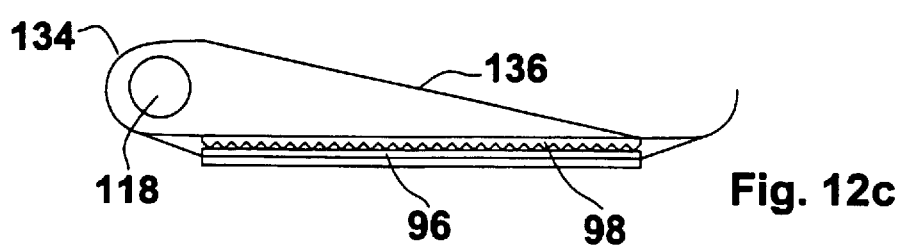
FIG. 12c is a cross-sectional view of the lighting fixture of FIG. 12a taken along the line XIIc—XIIc.

FIGS. 12a through 12c show a single-lamp embodiment. However, it is also possible to provide an additional lamp at the side of the light fixture opposite the lamp 118, and the roles of the roof walls 132 and 136 will become interchanged with respect to this additional lamp.

According to another aspect of the invention, a different luminous intensity and/or a different color of the emerging light can be generated in sub-regions of the light exit face on the basis of a corresponding design of the light output device.

Figure 13B:
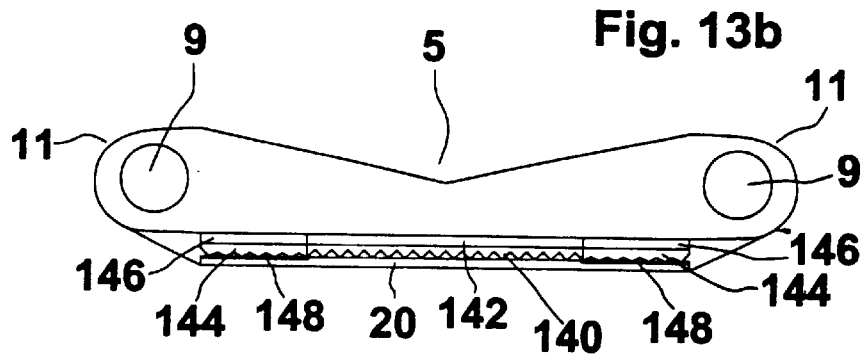
FIG. 13b is a cross-sectional view of the lighting fixture of FIG. 13a taken along the line XIIIb—XIIIb.
Figure 13A:
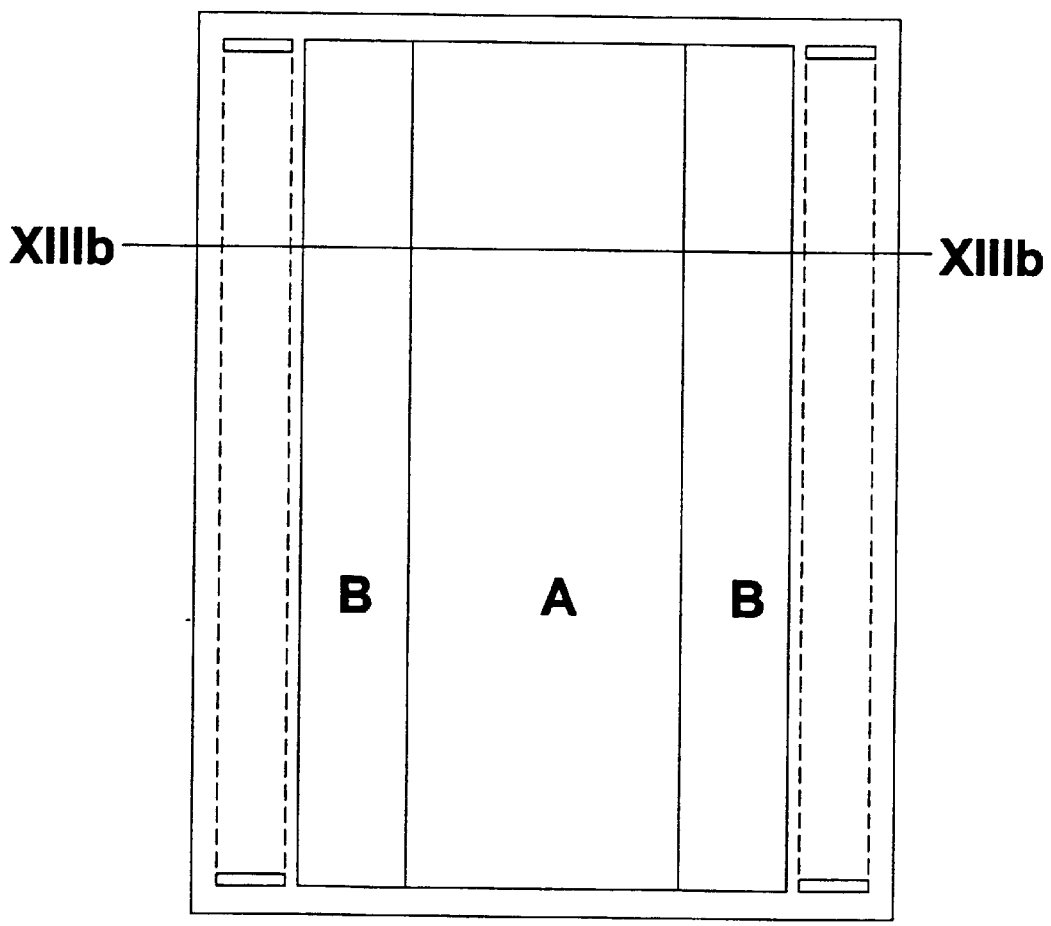
FIG. 13a is a bottom plan view of a tenth exemplary embodiment of an inventive lighting fixture.
Figure 14:
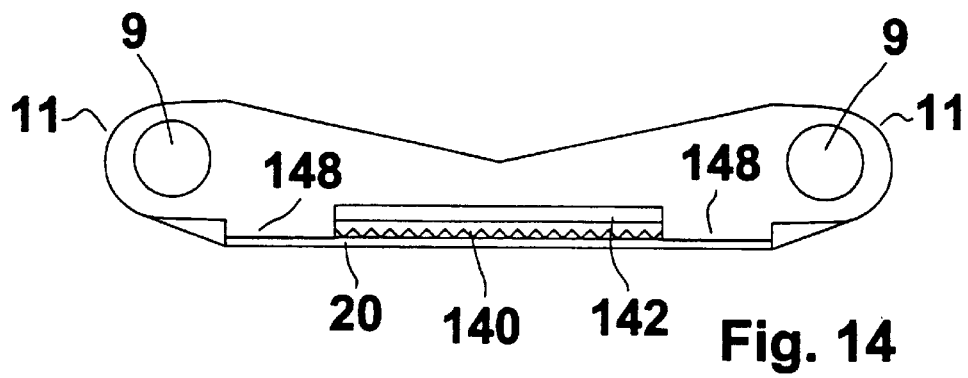
FIG. 14 is a cross-sectional view similar to FIG. 1 of an eleventh exemplary embodiment of an inventive lighting fixture.

FIGS. 13a and 13b show an embodiment of the invention wherein the light output device in the region A is composed of a first pair of prism plates 140 and 142, whereas the light output device in the regions B, which adjoin the region A at the right and left and that, like the region A, extend over the entire length of the lamp is composed of a pair of prism plates 144 and 146. The prisms 140 through 146 are fashioned and aligned as described above with reference to FIGS. 2 and 3, however, the prisms are facing away from the roof walls. The prism plates 140 and 142 exhibit a different prism angle then the prisms of the plates 144 and 146. Overall, the prism plates 140 through 146 are mounted on a carrier plate 20. A foil 148 is inserted between the prism plates 144 and the carrier plate 20 and the foil 148 partially absorbs light and/or forms a color filter, so that the light emerging in the regions B comprises a different luminous intensity and/or a different color than the light emerging in the region A. Otherwise, the light fixture is fashioned similar to that shown in FIG. 1. Identical component parts or component parts having the same effect are therefore provided with the same reference characters. In the exemplary according to FIG. 13, the foil 148 should not be dispersive in order to not deteriorate the emission properties produced by the prism plates, particularly a shielding. Insofar as no particular design of the light intensity distribution curve is required or desired in the regions B, the prism plates in this region can also be omitted, so that the light in the region B is directly incident onto the foil 148, this also being potentially dispersive in this case. Such an embodiment is shown in FIG. 14. A corresponding coating of the carrier plate can be provided instead of a foil.

Figure 15:
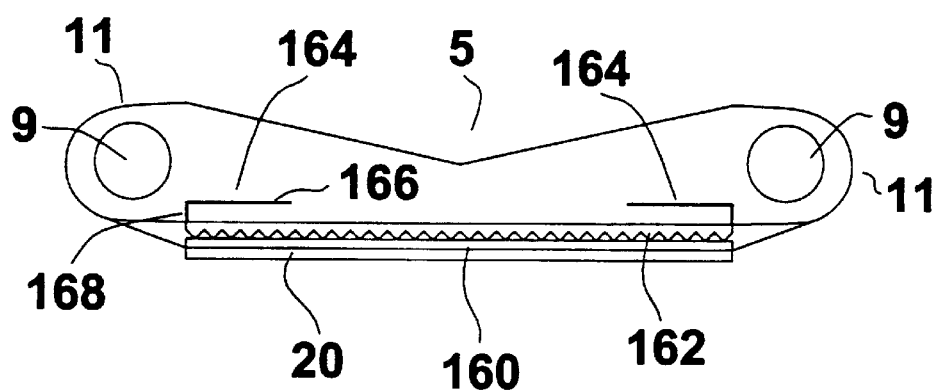
FIG. 15 is a cross-sectional view similar to FIG. 1 of a twelfth embodiment of an inventive lighting fixture.

FIG. 15 shows an embodiment of the invention wherein a reduced luminous intensity is produced in the side regions. An angular reflector element 164 is arranged in sub-regions, for example at the right and left edge, over two prism plates 160 and 162 which extend over the entire length and width of the light exit face and provide a uniform light-refractive structure over the entire area. One leg 166 of said angular reflector element 164 is parallel to the plates 160 and 162 and the second leg 168 thereof extends perpendicular to the plates 160 and 162. The reflector element 164 is respectively reflectively fashioned at the inside and outside surfaces. The light from the respectively neighboring lamp 9 can therefore not be incident directly onto the region of the plates 160 and 162 under the reflector element 164 and, on the contrary, is reflected to the roof wall 5 by the outside surface of the leg 166. Light from the lamp 9 lying at the opposite side can be partially incident in the region under the reflector element 164 and, otherwise, light can enter that had been previously reflected at the roof wall 5 and, potentially, at the prism plates 160 and 162. When the light has entered in the region under the element 164, it is steered by the reflective inside surfaces of the two legs 166 and 168 as well as, potentially, by reflection at the prism plate 162. The region under the reflector element 164 thus forms a quasi second hollow light guide in the large hollow light guide that is formed by the roof wall and the plates 160 and 162, so that only a part of the light beamed in overall by the lamps 9 is coupled into this second hollow light guide. Overall, the reflector element 164 leads to an occlusion in the region B, so that the region of the light exit face under this reflector element appears darker. As warranted, the inside of the reflector element 164 can be provided with a coloring coating, for example can be chromatically lacquered, or can be provided with a fluorescent substance, so that the region under the reflector element 164 has a contrast in color with the rest of the light exit face.

The above-described exemplary embodiments can be modified or combined in numerous ways. It can be fundamentally provided that different structures for light output, different roof reflectors and/or different devices for generating a reduced luminous intensity or a color are provided in various regions of the hollow light guide or of the light fixture. Likewise, the geometries of the prism plates explained above can be utilized in different embodiments. For example, a prism plate via which white light is coupled out with a shielded light intensity distribution can be arranged in the inside of the second prism plate that proceeds all around similar to that shown in the exemplary embodiment of FIG. 8a, whereby colored light, potentially having a non-shielded and/or wide-angle light intensity distribution, is output via the second, outer prism plate.

The above-described properties of the light intensity distribution curve in the various regions (shielded, wide-angle, etc.) are purely by way of example, as are the prism angles of the respectively appertaining prism structures recited therefor. Fundamentally, arbitrary light intensity distributions of the direct light part can be established in the various regions of the light output device, dependent on the light-oriented task, these light intensity distributions being capable of being realized by output from a hollow light guide having a light-refractive structure. Likewise, the prism angles in the various regions can be varied in conformity with the respective light-oriented task Other light sources, for example compact fluorescent bulbs, light-emitting diodes, etc., can also be utilized instead of the rod-shaped or annular lamps that are shown.

Although various minor modifications maybe suggested by those versed in the art, it should be understood that I wish to embody within the scope of the patent granted hereon all such modifications as reasonably and properly come within the scope of my contribution to the art.

I claim:

1. A lighting fixture comprising at least one hollow light guide having a cavity, at least one lamp that emits light into the cavity of the hollow light guide, at least one light output device having a light-refractive structure for outputting light from the cavity of the hollow light guide to a light exit face, the light output device comprising a plurality of components having different light-refractive structures and forming at least a part of a wall of the hollow light guide and the fixture having a plurality of differently fashioned regions having different light emission properties.

2. A lighting fixture according to claim 1, wherein the light output device includes a plurality of regions having different light-refractive structures for light output.

3. A lighting fixture according to claim 1, wherein the light output device comprises a sub-region without a light-refractive structure that deflects the passing light in a directed fashion.

4. A lighting fixture according to claim 3, wherein the light output device comprises no light-refractive structure that deflects the passing light in a directed fashion in a sub-region so that an element that limits one of the luminous intensity or color is effective.

5. A lighting fixture according to claim 2, wherein a first region of the light output device has prism elements with prism angles of more than 90° and a second region of the light output device has prism elements with a prism angle of 55° to 80°.

6. A lighting fixture having a plurality of differently fashioned regions having different light emission properties, said lighting fixture comprising at least one hollow light guide having a cavity, at least one lamp that emits light into the cavity of the hollow guide, at least one light output device having a light-refractive structure for outputting light from the cavity of the hollow light guide to a light exit face, the light output device forming at least a part of a wall of the hollow light guide, and light of the at least one lamp being directed into the hollow light guide and being directed out of the different regions of the lighting fixture having the different light emission properties, said lighting fixture comprising at least two wall regions being positioned along a lamp axis and extending opposite the light output device and each of said wall regions having a reflective wall with a different structure, so that the reflective wall of one of the at least two wall regions reflects the light of the lamp onto the output device differently than the reflective wall of the other of the at least two wall regions.

7. A lighting fixture according to claim 6, wherein the reflective walls comprise curved surfaces or planar surfaces and wherein the walls may be inclined relative to each other.

8. A lighting fixture according to claim 6, which includes a reflective wall extending opposite the light output device, said wall has wall regions positioned along a direction extending along an axis of the lamp, said wall regions having different inclinations relative to each other.

9. A lighting fixture according to claim 8, wherein the lamp directs light only at part of the wall regions of the reflective wall.

10. A lighting fixture according to claim 1, wherein said plurality of differently fashioned regions of said fixture comprises a plurality of differently fashioned regions of the hollow light guide and the light being emitted through the light output device has different properties in different regions.

11. A lighting fixture having a plurality of differently fashioned regions having different light emission properties, said lighting fixture comprising at least one hollow light guide having a cavity, at least one lamp that emits light into the cavity of the hollow light guide, at least one light output device having a light-refractive structure for outputting light from the cavity of the hollow light guide to a light exit face, the light output device forming at least a part of a wall of the hollow light guide and light of the at least one lamp being directed into the hollow light guide and being directed out of the different regions of the lighting fixture having the different light emission properties and comprising at least two regions having a reflective wall extending opposite the light output device, in a first region, the reflective wall being directed relative to the lamp so that the light incident onto the reflective wall from the lamp is incident essentially at a surface facing toward the cavity and is reflected into the cavity, and, in a second region, the light of the same lamp incident onto the reflective wall of the second region is reflected at least partially onto a side facing away from the cavity and is reflected away from the cavity for output as an indirect light part.

12. A lighting fixture have a plurality of differently fashioned regions having different light emission properties, said lighting fixture comprising at least one hollow light guide having a cavity, at least one lamp that emits light into the cavity of the hollow light guide, at least one light output device having a light-refractive structure for outputting light from the cavity of the hollow light guide to a light exit face, the light output device forming at least a part of a wall of the hollow light guide, and the light exit face comprising a first region having a first average luminous intensity and a second region adjoining the first region and having a second average luminous intensity that is lower than the first average luminous intensity.

13. A lighting fixture according to claim 12, wherein a device that reduces the light intensity of the light output via a light output device in a sub-region of the light output device is provided in the cavity near or adjacent the light output device.

14. A lighting fixture according to claim 13, wherein a partially light-transmitting element is arranged in the inside of the cavity at a distance from the light output device, said element reducing the light intensity of the light incident onto a sub-region of the light output device.

15. A lighting fixture according to claim 13, wherein an element is arranged in the inside of the cavity of the hollow light guide spaced from the light output device, said element being arranged between the light output device and a wall lying opposite the light output device and extending over a sub-region of the cavity, said element being reflective at a side facing toward the light output device and at a side lying opposite this side.

16. A lighting fixture according to claim 13, wherein a light intensity distribution curve in the region having a reduced luminous intensity covers a larger angular range than in the region having luminous intensity.

17. A lighting fixture according to claim 12, wherein an element that reduces the light is provided adjacent the light-refractive structure in a sub-region in the light output device.

18. A lighting fixture having a plurality of differently fashioned regions having different light emission properties, said lighting fixture comprising at least one hollow light guide having a cavity, at least one lamp that emits light into the cavity of the hollow light guide, at least one light output device having a light-refractive structure for outputting light from the cavity of the hollow light guide to a light exit face, the light output device forming at least a part of a wall of the hollow light guide, the light exit face having a first region and a second region adjoining the first region, and coloring means so that the emerging light of the second region has a different color than that in the first region and the light of the at least one lamp is directed out of the different regions of the lighting fixture.

19. A lighting fixture according to claim 18, wherein a coloring device for producing a specific color of the light emerging from the light output device is provided in the cavity adjacent a sub-region of the light output device.

20. A lighting fixture according to claim 19, wherein the light output device comprises a planar, light-transmissive element that is constructed at least partially with coloring so that the coloring region of this element forms a sub-region of the light output device.

21. A lighting fixture according to claim 18, wherein a coloring element that modifies the color of the light incident onto a sub-region of the light output device is arranged in the inside of the cavity at a distance from the light output device.

22. A lighting fixture according to claim 19, wherein an element reflective at both sides is arranged in the inside of the cavity spaced from the light output device, said element being arranged between a light output device and a wall lying opposite the light output device and extending over a sub-region of the cavity with the side of said element facing toward the light output device being provided with a coloring function.

23. A lighting fixture according to claim 18, wherein an element of the light output device is followed by a color-selective device that modifies the color of the emerging light on a part of the light exit face.

24. A lighting fixture according to claim 18, wherein a luminous intensity in a region of the light exit face is lower in a region where chromatic light is output than in a region where whit light is output.

25. A lighting fixture according to claim 1, wherein said light output device includes a plurality of regions having different light-refractive structures for light output wherein each region includes prism elements having uniform prism angles throughout the region.

26. A lighting fixture according to claim 1, wherein said lamp is positioned adjacent said cavity along one side thereof.

27. A lighting fixture having a plurality of differently fashioned regions having different light emission properties, said lighting fixture comprising at least one hollow light guide having a cavity, at least one lamp that emits light into the cavity of the hollow light guide, at least one light output device having a light-refractive structure for outputting light from the cavity of the hollow light guide to a light exit face, the light output device forming at least a part of a wall of the hollow light guide, the lighting fixture having a plurality of regions having different light emission properties, wherein the longitudinal axis of said lamp is transverse to said regions.

28. A lighting fixture according to claim 27 wherein the length dimension of said lamp is less than the length dimension of said fixture.

29. A lighting fixture according to claim 28, wherein said lamp is positioned with one end thereof adjacent one end of said fixture.

30. A lighting fixture having a plurality of differently fashioned regions having different light emission properties, said lighting fixture comprising at least one hollow light guide having a cavity, at least one lamp the emits light into the cavity of the hollow light guide, the at least one lamp being a straight lamp, at least one light output device having a light-refractive structure for outputting light from the cavity of the hollow light guide to a light exit face, the light output device forming at least a part of a wall of the hollow light guide and the light output device including a first region having first light-refractive structure and a second region having a second light refractive structure different from the first light refractive structure, said first region at least partly surrounding the second region so that light of the at least one lamp is directed out of the different regions of the lighting fixture.

31. A lighting fixture comprising at least one hollow light guide having a cavity, at least one lamp that emits light into the cavity of the hollow light guide, at least one light output device having a light-refractive structure for outputting light from the cavity of the hollow light guide to a light exit face, the light output device forming at least a part of a wall of the hollow light guide and the fixture having a plurality of differently fashioned regions having different light emission properties, said plurality of differently fashioned regions of said fixture comprising a plurality of differently fashioned regions of the hollow light guide so that light being directed out of different regions of the lighting fixture have different light emission properties and the light emitted at the light exit face of the lighting fixture in a first region has a symmetrical light intensity distribution curve and in a second region has an asymmetrical light intensity distribution curve.

32. A lighting fixture having a plurality of differently fashioned regions having different light emission properties, said fixture comprising at least one hollow light guide having a cavity, at least one lamp that emits light into the cavity of the hollow light guide, at least one light output device having a light-refractive structure for outputting light from the cavity of the hollow light guide to a light exit face, the light output device forming at least a part of a wall of the hollow light guide and light of the at least one lamp being directed into the hollow light guide and being directed out of the different regions of the lighting fixture having different light emission properties, wherein the longitudinal axis of said lamp is transverse to said regions.

33. A lighting fixture having a plurality of differently fashioned regions having different light emission properties, said fixture comprising at least one hollow light guide having a cavity, at least one lamp that emits light into the cavity of the hollow light guide, at least one light output device having a light-refractive structure for outputting light from the cavity of the hollow light guide to a light exit face, the light output device forming at least a part of a wall of the hollow light guide and light of the at least one lamp being directed into the hollow light guide and being directed out of the different regions of the lighting fixture having different light emission properties, wherein said light output device comprises a sub-region having no light-refractive structure that deflects the passing light in a directed fashion so that an element that limits one of the luminous intensity or color is effective.

34. A lighting fixture having a plurality of differently fashioned regions having different light emission properties, said fixture comprising at least one hollow light guide having a cavity, at least one lamp that emits light into the cavity of the hollow light guide, at least one light output device having a light-refractive structure for outputting light from the cavity of the hollow light guide to a light exit face, the light output device forming at least a part of a wall of the hollow light guide and light of the at least one lamp being directed into the hollow light guide and being directed out of the different regions of the lighting fixture having different light emission properties, and a reflective wall extending opposite the light output device, said wall having wall regions positioned along a direction extending along an axis of the lamp, said wall regions having different inclinations relative to each other, wherein the lamp directs light only at part of the wall regions of the reflective wall.

35. A lighting fixture having a plurality of differently fashioned regions having different light emission properties, said fixture comprising at least one hollow light guide having a cavity, at least one lamp that emits light into the cavity of the hollow light guide, at least one light output device having a light-refractive structure for outputting light from the cavity of the hollow light guide to a light exit face, the light output device forming at least a part of a wall of the hollow light guide and light of the at least one lamp being directed into the hollow light guide and being directed out of the different regions of the lighting fixture having different light emission properties, wherein said plurality of differently fashioned regions of said fixture comprises a plurality of differently fashioned regions of the hollow light guide and the light being emitted through the light output device has different properties in different regions.

36. A lighting fixture comprising at least one hollow light guide having a cavity, at least one lamp that emits light into the cavity of the hollow light guide, at least one light output device having a light-refractive structure for outputting light from the cavity of the hollow light guide to a light exit face, the light output device forming at least a part of a wall of the hollow light guide, said hollow light guide and said light output device forming a plurality of differently fashioned regions having different light emission properties for directing light of the at least one lamp out of said fixture having different lighting characteristics when observed from different locations relative to said fixture.

37. The lighting fixture of claim 36 wherein said light output device comprises a plurality of components having different light-refractive structures.

* * * * *